UNITED STATES PATENT OFFICE.

CHARLES A. DIEHL AND WILLIAM KOEHLER, OF CLEVELAND, OHIO.

METHOD OF TREATING ORES.

No. 842,139.  Specification of Letters Patent.  Patented Jan. 22, 1907.

Application filed March 28, 1906. Serial No. 308,580.

*To all whom it may concern:*

Be it known that we, CHARLES A. DIEHL and WILLIAM KOEHLER, citizens of the United States, residing at Cleveland, in the county of Cuyahoga and State of Ohio, have invented certain new and useful Improvements in Methods of Treating Ores, of which the following is a specification.

This invention is a method of treating ores, mattes, concentrates, and other metallurgical products preparatory to leaching, the object of the invention being to so prepare the materials that the leaching may be effected economically and with the production of a comparatively pure metal-bearing solution, part or all of the chlorin combined with the base metals of the ore being recovered as chlorin or hydrochloric acid and utilized as desired.

By way of example the method will be described as applied to an ore of nickel, the preferred procedure being as follows: The ore, which may contain nickel, magnesium, aluminium, and iron, with or without gangue, is first chloridized by known methods in order to effect the more or less complete conversion of the several metals into chlorids. The chloridized ore is then placed in a drum or other vessel suitable for mixing and heating and is subjected therein at a suitable temperature to the action of oxygen, which may be supplied either in a free state, as air, or in combination with hydrogen, as water or steam. The temperature should be below the point of decomposition of the chlorid of the metal or metals to be recovered—in the present instance nickel—but above the point at which the chlorids of the remaining metals, herein designated as "base" metals, are decomposed. The product of decomposition of the base-metal chlorids will depend upon the temperature and duration of the treatment. All of the chlorin may be expelled, in which case the oxids of the base metals will remain, as a residue or a portion only of the chlorin may be driven off, leaving as a residue the corresponding oxychlorid. In case a sufficiently high temperature is used and air is employed for effecting the decomposition the reaction results in the production of the oxids of the base metals and the liberation of chlorin and proceeds according to Equation 1; whereas in presence of the vapor of water hydrochloric acid is set free with formation of the oxids of the base metals, as shown in Equation 2.

(1) $M''Cl_2 + M'''_2Cl_6 + 2O_2 =$
$M''O + M'''_2O_3 + 4Cl_2.$ (2) $M''Cl_2 + M'''_2Cl_6 + 4H_2O =$
$M''O + M'''_2O_3 + 8HCl.$

If a mixture of air and water-vapor be employed, the two reactions will occur simultaneously and a mixture of chlorin and hydrochloric acid will be evolved. The chlorin or hydrochloric acid so produced may be utilized for chloridizing further quantities of ore.

It will be noted that the specific ore above referred to contains, in addition to nickel, a divalent metal (magnesium) and a trivalent metal, (aluminium or iron,) and such mixture is found in practice to be highly advantageous, as hereinafter more fully explained. In the equations, $M''$ is employed as representing any of the divalent metals—magnesium, zinc, barium, calcium, strontium, or others allied thereto—and $M'''$ represents a trivalent metal of the type which includes iron, aluminium, and chromium. The chlorids of the trivalent metals are not easily completely decomposed by oxygen; but we have found that such decomposition occurs readily and with substantial completeness in presence of the chlorids or oxids of the divalent metals. For this reason if one or more metals of the divalent group are not already present in the ore it is preferably added thereto. Under such conditions and at a suitable temperature, which in the specific instance described will be below a red heat, there occurs a combination between the oxids of the divalent and trivalent groups forming double oxids of the general type $M''O, M'''_2O_3$, which are relatively stable compounds and are only very slowly soluble in the water or dilute hydrochloric or sulfuric acid employed in the subsequent leaching. Their solubility is further decreased by heating in presence of hydrochloric acid or chlorin such as occurs in the practice of the method above described. Furthermore, the physical state of the resulting material is such as to permit the rapid and substantially complete extraction of the nickel by leaching with water or, preferably, with dilute acid. No injurious effect follows from the presence of an excess of divalent oxid, since any oxid or hydroxid of nickel which might be precipitated thereby is readily soluble in the dilute leaching-acid. The solution obtained by leaching may be further purified and the metal recovered by known methods.

As a further specific example of our method we will describe its application to sulfid ores containing iron and zinc, the iron existing in the ore in the ferrous condition. Such ores are chloridized by suitable methods to convert both iron and zinc into chlorids and are thereafter roasted in an oxidizing atmosphere to decompose the chlorid of iron. The roasted ore contains ferric oxid and zinc chlorid, of which the latter may be extracted by leaching, as above described.

The advantages of our improved method are obvious. The temperature required is always below the decomposing point of the chlorid of the metal or metals to be recovered, which presents a decided economy over methods involving the calcination of ores containing talc or clay. The chlorin combined with the base metals is largely recovered in a form available for immediate use. The oxidized residues remaining are only very slowly soluble in the usual leaching liquids, whereby metal-bearing solutions are obtained which are but slightly contaminated by the base-metal chlorids, and ores which, owing to their content of clay or other finely-divided matter, could be leached with difficulty are converted into a physical condition which greatly facilitates this operation.

We claim—

1. The method of treating ores containing metals whose chlorids are decomposed under oxidizing conditions at substantially different temperatures, which consists in fully chloridizing the ore, and then heating the chloridized ore under oxidizing conditions to a temperature sufficient to decompose the more readily decomposable chlorids with evolution of chlorin or hydrochloric acid, while leaving the chlorid of the remaining metal or metals substantially undecomposed, substantially as described.

2. The method of treating ores containing metals whose chlorids are decomposed under oxidizing conditions at substantially different temperatures, which consists in first converting the metals of the ore into chlorids, and then heating the chloridized ore in the presence of water-vapor to a temperature sufficient to decompose the more readily decomposable chlorids, while leaving the chlorid of the remaining metal or metals substantially undecomposed, substantially as described.

3. The method of treating ores containing nickel, together with metals whose chlorids are more readily decomposed under oxidizing conditions than nickel chlorid, which consists in first converting the metals of the ore into chlorids and then heating the ore under oxidizing conditions to a temperature sufficient to decompose the more readily decomposable chlorids, while leaving the chlorid of nickel substantially undecomposed, substantially as described.

4. The method of treating ores containing divalent and trivalent metals, which consists in fully chloridizing the ore and then heating the ore under oxidizing conditions to a temperature sufficient to effect the decomposition of the more readily decomposable chlorids and the formation of an oxidized compound, while leaving the chlorid of the remaining metal or metals substantially undecomposed, substantially as described.

In testimony whereof we affix our signatures in presence of two witnesses.

CHARLES A. DIEHL.
WILLIAM KOEHLER.

Witnesses:
 CHAS. E. BAKER,
 D. H. POND.